United States Patent [19]

Maekawa et al.

[11] 4,228,251
[45] Oct. 14, 1980

[54] RESIN COMPOSITION HAVING LOW SHRINK PROPERTIES

[75] Inventors: Iwao Maekawa; Isao Uchigasaki; Noboru Monma, all of Hitachi, Japan

[73] Assignee: Hitachi Chemical Company, Ltd., Japan

[21] Appl. No.: 964,798

[22] Filed: Nov. 30, 1978

[30] Foreign Application Priority Data

Dec. 26, 1977 [JP] Japan ................................. 52-156903

[51] Int. Cl.$^2$ .............................................. C08L 67/06
[52] U.S. Cl. .................................... 525/168; 260/40P; 525/27; 525/36; 525/40; 525/42; 525/43; 525/49; 525/177
[58] Field of Search ............... 260/862, 871, 872, 873, 260/40 R; 525/27, 36, 40, 42, 43, 49, 168, 177

[56] References Cited

U.S. PATENT DOCUMENTS

| | | | |
|---|---|---|---|
| 3,502,921 | 3/1970 | Souza et al. | 260/862 |
| 3,883,612 | 5/1975 | Pratt et al. | 260/862 |
| 4,052,358 | 10/1977 | Wada et al. | 260/862 |

*Primary Examiner*—J. Ziegler
*Attorney, Agent, or Firm*—Craig & Antonelli

[57] ABSTRACT

A resin composition which comprises (A) 50 to 90 parts by weight of an unsaturated ester oligomer produced by reacting a glycol, hydroxylated dicyclopentadiene, and at least one unsaturated dibasic acid or anhydride thereof until an acid value of less than 40, (B) 50 to 10 parts by weight of one or more polymerizable monomers, and (C) 3 to 15 parts by weight of polystyrene based on 100 parts by weight of the total of the components (A) and (B), can give molded articles having low shrink properties and improved color shading, cracks, etc.

15 Claims, No Drawings

RESIN COMPOSITION HAVING LOW SHRINK PROPERTIES

This invention relates to a resin composition having low shrink properties, more particularly to a one-pack type resin composition having low shrink properties, hardly bringing about phase separation of the thermoplastic resin component and being stable.

Unsaturated polyester resins usually have a shrinkage factor of 6 to 9%. In order to reduce the shrinkage factor to 2 to 0.1%, there has been known a composition dispersing a thermoplastic resin in an unsaturated polyester resin, which is cured while maintaining such dispersing state. Such a composition has widely been used in various applications such as materials for producing SMC (sheet molding compounds), BMC (bulk molding compounds), preforms, resin concrete, electrical insulating cast moldings, and the like, by employing molding using a mold, open molding at normal temperatures, etc. But generally speaking, since compatibility of the unsaturated polyester resin with the thermoplastic resin is poor in such a composition, those skilled in the art are impressed in that the composition easily brings about the phase separation and is poor in workability. More concretely, there is no problem in the case of thickening the unsaturated polyester resin by using a metal oxide such as SMC and BMC, but in the case of using the composition for producing preforms, resin concrete, electrical insulating cast moldings, and the like, a working step of mixing the unsaturated polyester resin with the thermoplastic resin with stirring so as to be sufficiently dispersed is necessary immediately before the use of the composition except for the case of using a thermoplastic resin having relatively good compatibility with the unsaturated polyester resin, for example, some of ester resins (saturated polyesters), polyvinyl acetate, or the like. But even though employing such a method, defective moldings derived from the phase separation are produced practically. Particularly, this tendency is remarkable in the case of using polystyrene as the thermoplastic resin, the polystyrene having the most excellent effect on low shrink properties among thermoplastic resins at both curing at normal temperatures and curing at high temperatures and hence being widely used. Troubles at the molding due to the phase separation easily take place particularly in summer or in the case of curing at normal temperatures, and typical ones are stickiness of the surface due to uneven distribution of the thermoplastic resin, cracks and uneven color tone due to unevenness of shrinkage, failure in adhesion to a base material due to insufficient shrinkage effect, and the like.

Therefore, there has been a strong demand for a stable one-pack type resin composition having low shrink properties and excellent compatibility, and being free from the phase separation.

The present inventors have studied curable unsaturated polyester resins which have good compatibility with polystyrene in order to overcome the defects as mentioned above and accomplished the present invention, which provides a very stable complete one-pack type resin composition having low shrink properties and excellent physical properties.

This invention provides a resin composition having low shrink properties which comprises (A) 50 to 90 parts by weight of an unsaturated ester oligomer produced by carrying out condensation reaction of a glycol and hydroxylated dicyclopentadiene in an amount of 100 to 200% by mole per mole of the glycol with at least one unsaturated dibasic acid or anhydride thereof until an acid value of less than 40, (B) 50 to 10 parts by weight of one or more polymerizable monomers having one or more polymerizable double bonds in the molecule, and (C) 3 to 15 parts by weight of polystyrene based on 100 parts by weight of the total of the components (A) and (B).

The component (A) is the unsaturated ester oligomer produced by reacting an alcohol component with an acid component until an acid value of less than 40. The term "oligomer" includes dimer to pentamer or hexamer.

The alcohol component includes a glycol and hydroxylated dicyclopentadiene. Examples of glycols are ethylene glycol, diethylene glycol, propylene glycol, dipropylene glycol, 1,3- or 1,4-butanediol, 1,6-hexanediol, ethylene oxide or propylene oxide adduct of bisphenol, neopentyl glycol, etc. Hydroxylated dicyclopentadiene is used in an amount of 100 to 200% by mole per mole of the glycol. If the amount is less than 100% by mole, the composition may easily bring about the phase separation, whereas if the amount is more than 200% by mole, reactivity of the ester oligomer becomes lower and the desired low shrinkage effect cannot be expected.

As the acid component, one or more unsaturated dibasic acids or anhydrides thereof are used. Examples of the unsaturated dibasic acids or anhydrides thereof are $\alpha,\beta$-unsaturated dicarboxylic acids or anhydrides thereof such as maleic anhydride, fumaric acid, itaconic acid, citraconic acid, maleic acid, etc.

The condensation reaction is carried out by using chemically equivalent weights of the alcohol component and the acid component at a temperature of from 180° to 230° C., preferably in an inert atmosphere such as nitrogen, carbon dioxide gas, until an acid value of less than 40. If the acid value is 40 or more, the resulting resin composition cannot show satisfactory performance in curing and physical properties of the molded articles due to unreacted glycol, hydroxylated dicyclopentadiene and unsaturated dibasic acid. The acid value can be measured according to JIS K 6901 by sampling the reaction mixture during the reaction. It is preferable to complete the reaction at an acid value of less than 30.

The reaction can also be carried out by using an excess amount of the alcohol component, for example 5 to 10% by mole in excess as in the case of synthesis of general unsaturated polyester resins without causing any troubles.

As the component (B), one or more polymerizable monomers having one or more polymerizable double bonds in the molecule are used. Examples of these monomers are those usually used in producing unsaturated polyester resins such as styrene, vinyltoluene, divinylbenzene, diallyl phthalate, chlorostyrene, etc. and other polymerizable monomers which can dissolve polystyrene used as the component (C), for example, those of acrylate or methacrylate series.

The unsaturated ester oligomer is used in an amount of 50 to 90 parts by weight to 50 to 10 parts by weight of the polymerizable monomer. When the amount of the unsaturated ester oligomer is less than 50 parts by weight and that of the polymerizable monomer is more than 50 parts by weight, or the amount of the unsaturated ester oligomer is more than 90 parts by weight and that of the polymerizalbe monomer is less than 10 parts by weight, the resulting molded articles are inferior in physical properties such as mechanical properties because the cured articles retaining effective reactive double bonds are obtained due to upsetting of the balance of reactive double bonds during the copolymerization of the two components. Particularly, in the latter case, i.e. the unsaturated ester oligomer being more than 90 parts by weight and the polymerizable monomer being less than 10 parts by weight, a viscosity of the resin composition increases to give unfavorable effects on workability. It is preferable to use 50 to 70 parts by weight of the unsaturated ester oligomer to 50 to 30 parts by weight of the polymerizable monomer.

As the component (C), polystyrene is used in an amount of 3 to 15 parts by weight based on 100 parts by weight of the total of the components (A) and (B). As the polystyrene, not only homopolymer of styrene but also copolymers of styrene and one or more other monomers containing 20% by weight or more of styrene can be used so far as they can be dissolved in the copolymerizable monomer, irrespective of their molecular weights. Among them, polystyrene having an average molecular weight of 50,000 to 200,000 is preferable.

If the amount of polystyrene is less than 3 parts by weight, the effect on low shrink properties is insufficient, whereas if the amount is more than 15 parts by weight, curing of molded articles becomes insufficient, which results in easily producing stickiness, insufficiency in gloss, cavity and deterioration of mechanical properties. It is preferable to use 6 to 13 parts by weight of polystyrene based on 100 parts by weight of the total weight of the components (A) and (B).

The resin composition of the present invention can be cured by curing with heating using a peroxide or by curing at normal temperatures using a combination of a peroxide and a curing accelerator.

As the peroxides, there can be used conventional ones such as benzoyl peroxide, methyl ethyl ketone peroxide, di-t-butyl peroxide, cumene hydroperoxide, t-butyl peroxide, etc.

As the curing accelerators, there can be used conventional ones such as metal soaps wherein the metal is cobalt, copper, manganese, lead, etc.; tertiary amines; $\beta$-diketones, and the like.

There is no particular limitation in the amount to be used, and in the combination of the peroxide and the curing accelerator.

The resin composition of the present invention may further contain, if required, a filler such as calcium carbonate, silica sand, talc, etc; a colorant such as pigments and dyes; a reinforcing material such as inorganic fibers, e.g. glass fiber, carbon fiber, etc. and organic fibers, e.g. poly(vinyl alcohol) fiber, polyester fiber, etc.

The resin composition of the present invention can widely be used as industrial material for producing preforms, resin concrete, and electrical insulating cast moldings, and if desired, for SMC and BMC, etc.

The present invention is illustrated but not limited by the following Examples in which all parts and percents are by weight unless otherwise specified.

REFERENTIAL EXAMPLE (1) Synthesis of Ester Oligomer (EO 1)

In a 2-liter four-necked flask equipped with a condenser, a nitrogen introducing pipe, a thermometer, and a stirrer, 424 parts (4 moles) of diethylene glycol, 784 parts (8 moles) of maleic anhydride, 1200 parts (8.0 moles) of hydroxylated dicyclopentadiene, and 42.4 parts (0.4 mole) of diethylene glycol as an excess alcohol component were placed and the reaction was carried out at 150° C. for 2 hours under a nitrogen stream. Subsequently, the temperature was raised to 210° C. and samples were taken out to measure an acid value according to JIS K 6901. The reaction was continued for additional 6 hours until the acid value became 24.3 to give an ester oligomer (EO 1).

(2) Synthesis of Ester Oligomer (EO 2)

Using the same apparatus as mentioned above, 304 parts (4.0 moles) of propylene glycol, 588 parts (6.0 moles) of maleic anhydride, 600 parts (4.0 moles) of hydroxylated dicyclopentadiene, and 22.8 parts (0.3 mole) of propylene glycol as an excess alcohol component were placed in the flask and the reaction was carried out in the same manner as mentioned above until the acid value became 27.1 over 5 hours to give an ester oligomer (EO 2).

(3) Synthesis of Unsaturated Polyester (Rf 1) (Comparison)

Using the same apparatus as mentioned above, 588 parts (6.0 moles) of maleic anhydride, 592 parts (4.0 moles) of phthalic anhydride, and 798 parts (10.5 moles) of propylene glycol were reacted at 210° C. When the acid value became 31.8 after 6 hours, the reaction was stopped to give an unsaturated polyester (Rf 1).

EXAMPLES 1 AND 2, COMPARATIVE EXAMPLES 1 AND 2

Using the ester oligomer (EO 2) and the unsaturated polyester (Rf 1), resin compositions as listed in Table 1 were obtained. These resin compositions were used for producing boxes by a preform molding.

Molding conditions were as follows.

To 100 parts of a resin composition, 50 parts of calcium carbonate (SL 300, manufactured by Takehara Chemical Co.), 3 parts of zinc stearate, 2 parts of benzoyl peroxide paste (Naiper BO, manufactured by Nippon Yushi Co.) and 5 parts of colorant (ST-2750 Pastel Blue, manufactured by Dainichi Seika Co.) were added and stirred sufficiently by using a stirrer to give a uniform mixture.

Using a conventional preform molding, a box (glass content 33%) of 200×300×50 mm with 3 mm thick was molded under a molding pressure of 20 kg/cm$^2$ at a molding temperature of 125° C. for 2 minutes. Various properties of the molded articles were tested and listed in Table 1.

TABLE 1

| | | Example 1 | Example 2 | Comparative Example 1 | Comparative Example 2 |
|---|---|---|---|---|---|
| Composition (parts) | EO 2 | 55 | 61 | — | — |
| | Rf 1 | — | — | 55 | 61 |
| | Styrene | 45 | 39 | 45 | 39 |
| | Polystyrene*[1] | 12 | 8 | 12 | 8 |

Properties

TABLE 1-continued

|  | Example 1 | Example 2 | Comparative Example 1 | Comparative Example 2 |
|---|---|---|---|---|
| Shrinkage factor*2 (%) | 0.09 | 0.15 | 0.10 | 0.17 |
| Color shading*3 | ◎ | ◎ | X | Δ |
| Bending strength*4 (kg/mm²) | 16.2 | 17.8 | 17.1 | 17.6 |
| Phase separation*5 | No separation after 2 months | No separation after 2 months | Separated after 1 day | Separated after 1 day |

Note
*1Styron 679 manufactured by Asahi Dow Co., Ltd., having a softening point of 85° C.
*2Measured according to JIS K 6911.
*3The surfaces of a box was observed by the naked eye and evaluated as follows: ◎ . . . No color shading. Δ . . . Partial color shading. X . . . Color shading appeared on almost whole surfaces.
*4Measured according to JIS K 6911.
*5A resin composition was placed in a test tube having a diameter of 8 mm and days required for phase separation at 25° C. was observed.

EXAMPLE 3, COMPARATIVE EXAMPLE 3

Using the ester oligomer (EO 1) and the unsaturated polyester (Rf 1), resin compositions as listed in Table 2 were obtained. These resin compositions were used for producing resin concrete.

Molding conditions were as follows.

To 100 parts of a resin composition, 100 parts of #6 silica sand (manufactured by Hisago Sangyo K.K.), 100 parts of calcium carbonate (SL 300, manufactured by Takehara Chemical Co.), 1 part of methyl ethyl ketone peroxide (manufactured by Nippon Yushi Co.) and 0.5 part of cobalt octoate (cobalt content 6%) were added and kneaded in a kneader for 2 minutes. Subsequently, the resulting mixture was poured into a flat plate mold of 30 cm long, 30 cm wide and 5 cm thick and cured under 4 kg/cm² at 35° C. for 45 minutes. Then the molded article was removed from the mold and surface appearance was observed by the naked eye. Various properties were also tested and listed in Table 2.

TABLE 2

|  |  | Example 3 | Comparative Example 3 |
|---|---|---|---|
| Composition (parts) | EO 1 | 55 | — |
|  | Rf 1 | — | 55 |
|  | Styrene | 45 | 45 |
|  | Polystyrene*1 | 12 | 12 |
| Properties |  |  |  |
| Shrinkage factor*2 (%) |  | 0.6 | 2.1 |
| Surface appearance |  | A uniform molded article without crack and warpage was obtained. | Polystyrene was separated and distributed almost on the surface. Warpage and cracks took place partially. |
| Phase separation*3 |  | No separation after 3 months | Separated after 1 day |

Note
*1QP 2-301 manufactured by Denki Kagaku Kogyo K.K., having an average molecular weight of 15,000–20,000
*2Measured according to JIS K 6911
*3A resin composition was placed in a test tube having a diameter of 8 mm and days required for phase separation at 25° C. was observed.

EXAMPLE 4, COMPARATIVE EXAMPLE 4

Using the ester oligomer (EO 1) and the unsaturated polyester (Rf 1), resin compositions as listed in Table 3 were obtained. These resin compositions were used for producing electrical insulating cast moldings.

Molding conditions were as follows.

To 100 parts of a resin composition, 250 parts of a filler containing silica sand as a main component (H 122, manufactured by Hisago Sangyo K.K.), 1% of methyl ethyl ketone peroxide (manufactured by Nippon Yushi Co.) and 0.5% of cobalt octoate (cobalt content 6%) were added and stirred for 5 minutes using a laboratory stirrer to give a uniform mixture. Into a canister having a diameter of 750 mm and placing an iron cube of 30×30×30 mm at the bottom, the mixture obtained was poured immediately after the stirring or after allowing it to stand for 2 hours and cured at 25° C. for 1 hour, respectively. Various properties of the cast moldings were tested and listed in Table 3.

TABLE 3

|  |  | Example 4 | Comparative Example 4 |
|---|---|---|---|
| Composition (parts) | EO 1 | 61 | — |
|  | Rf 1 | — | 61 |
|  | Styrene | 39 | 39 |
|  | Polystyrene*1 | 8 | 8 |
| Properties |  |  |  |
| Shrinkage factor*2 (%) |  | 0 | 2.1 |
| Adherence*3 |  |  |  |
| Without allowing to stand |  | ◎ | ○ |
| Allowed to stand for 2 hours |  | ◎ | X |
| Cycles of heating and cooling*4 |  | No change after 5 cycles | Cracked after 2 cycles |
| Phase separation*5 |  | No separation after 3 months | Separated after 1 day |
| State of the bottom of cured article after destroying the |  | No crack | Cracks were generated |

TABLE 3-continued

|  | Example 4 | Comparative Example 4 |
|---|---|---|
| canister |  |  |

Note
*¹Styron 679 manufactured by Asahi Dow Co., Ltd., having a softening point of 85° C.
*²Measured according to JIS K 6911
*³Space between the wall and a cured article was observed after allowing the article to stand for 1 day after cured and evaluated as follows: ⊙ Whole surface was adhered to the wall with no space. ◯ Space was observed partially but the article was almost adhered to the wall. X The article was completely separated from the wall and polystyrene was separated on the surface.
*⁴1 cycle consisted of heating at 120° C. for 1 hour and cooling at −5° C. for 1 hour.
*⁵A resin composition was placed in a test tube having a diameter of 8 mm and days required for phase separation at 25° C. was observed.

As is clear from the results in Tables 1, 2 and 3, the resin compositions of the present invention do not show the separation of polystyrene by introducing hydroxylated dicyclopentadiene to the production procedure of the ester oligomer. Therefore, the resin compositions of the present invention can be treated in the same manner as conventional unsaturated polyester resins, and further can provide a one-pack type resin composition having low shrink properties, which has been considered to be impossible for the conventional unsaturated polyester resins alone.

Consequently, improvements in color shading, cracks, warpage, adhesion, etc. can be attained, which results in applications of the resin composition of the present invention to very wide fields in which the conventional unsaturated polyester resins have not been used.

What is claimed is:

1. A resin composition having low shrink properties which comprises
    (A) 50 to 90 parts by weight of an unsaturated ester oligomer produced by carrying out condensation reaction of a glycol and hydroxylated dicyclopentadiene in an amount of 100 to 200% by mole per mole of the glycol with at least one unsaturated dibasic acid or anhydride thereof until an acid value of less than 40,
    (B) 50 to 10 parts by weight of one or more polymerizable monomers having one or more polymerizable double bonds in the molecule, and
    (C) 3 to 15 parts by weight of polystyrene based on 100 parts by weight of the total of the components (A) and (B).

2. A composition according to claim 1, wherein the glycol in the component (A) is ethylene glycol, diethylene glycol, propylene glycol, dipropylene glycol, 1,3-butanediol, 1,4-butanediol, 1,6-hexanediol, ethylene oxide adduct of bisphenol or propylene oxide adduct of bisphenol.

3. A composition according to claim 1, wherein the unsaturated dibasic acid or anhydride thereof is maleic acid, maleic anhydride, fumaric acid, itaconic acid or citraconic acid.

4. A composition according to claim 1, wherein the polymerizable monomer is styrene, vinyltoluene, divinylbenzene, diallyl phthalate or chlorostyrene.

5. A composition according to claim 1, wherein the polystyrene has an average molecular weight of 50,000 to 200,000.

6. A composition according to claim 1, wherein the glycol in the component (A) is diethylene glycol or propylene glycol.

7. A composition according to claim 6, wherein the unsaturated dibasic acid or anhydride thereof is maleic anhydride.

8. A composition according to claim 7, wherein the polymerizable monomer is styrene.

9. A composition according to claim 1, wherein said oligomer consists of the reaction product of an alcohol component and an acid component, said alcohol component consisting of at least one glycol and the hydroxylated dicyclopentadiene and the acid component consisting of at least one unsaturated dibasic acid or anhydride thereof, the reaction forming said reaction product being effected by using chemically equivalent weights of the alcohol component and the acid component or by using the alcohol component in an amount of 5 to 10% by mol in excess of the acid component.

10. A composition according to claim 9, wherein the reaction of said alcohol component with said acid component is effected at a temperature of from 180° to 230° C.

11. A composition according to claim 1, wherein said resin composition consists of component (A), component (B) and component (C).

12. A composition according to claim 1, wherein said composition contains a curable resin component, a filler, a colorant, a curing agent and a reinforcing material, said resin component consisting of (A), (B) and (C).

13. A cured resin composition consisting essentially of the cured product of the resin composition of claim 1 and an organic peroxide-containing curing agent.

14. A composition according to claim 1, wherein the polystyrene is a homopolymer of styrene having a molecular weight of 50,000 to 200,000.

15. A composition according to claim 11, wherein the polystyrene is a homopolymer of styrene having a molecular weight of 50,000 to 200,000.

* * * * *